US007794560B2

(12) United States Patent
Hoarau

(10) Patent No.: US 7,794,560 B2
(45) Date of Patent: Sep. 14, 2010

(54) METHOD AND SYSTEM OF SHEET-WISE BINDING OF DOCUMENTS

(75) Inventor: Eric Hoarau, Pleasant Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/953,549

(22) Filed: Sep. 30, 2004

(65) Prior Publication Data

US 2006/0067808 A1 Mar. 30, 2006

(51) Int. Cl.

| | |
|---|---|
| ***B29C 65/02*** | (2006.01) |
| ***B29C 65/52*** | (2006.01) |
| ***B29C 65/72*** | (2006.01) |
| ***B29C 65/74*** | (2006.01) |
| ***B32B 37/02*** | (2006.01) |
| ***B32B 37/04*** | (2006.01) |
| ***B32B 37/06*** | (2006.01) |
| ***B32B 37/12*** | (2006.01) |
| ***B32B 38/04*** | (2006.01) |
| ***B42C 19/02*** | (2006.01) |
| *B29C 65/34* | (2006.01) |
| *B32B 37/16* | (2006.01) |
| *B32B 38/14* | (2006.01) |
| *C08J 5/16* | (2006.01) |
| *B42C 11/00* | (2006.01) |
| *B42C 1/10* | (2006.01) |
| *B42C 5/04* | (2006.01) |
| *B42C 13/00* | (2006.01) |

(52) U.S. Cl. ....................... 156/264; 156/256; 156/265; 156/289; 156/308.2; 156/308.4; 156/300; 156/309.9; 412/4; 412/8; 412/19; 412/36; 412/37; 412/901; 412/902

(58) Field of Classification Search ................. 156/256, 156/264, 265, 277, 289, 300, 308.2, 308.4, 156/309.9; 412/4, 8, 16, 19, 36, 37, 900–902
See application file for complete search history.

(56) References Cited

U.S. PATENT DOCUMENTS

| | | | | |
|---|---|---|---|---|
| 3,458,376 | A * | 7/1969 | Malik | 156/233 |
| 3,794,550 | A * | 2/1974 | Taillie | 281/21.1 |
| 4,140,565 | A * | 2/1979 | Parker et al. | 156/219 |
| 4,793,758 | A * | 12/1988 | Hanson et al. | 412/4 |
| 4,911,475 | A | 3/1990 | Lerman | |
| 4,975,011 | A * | 12/1990 | Holmberg | 412/6 |
| 5,026,236 | A * | 6/1991 | Otake et al. | 412/33 |
| 5,035,447 | A * | 7/1991 | Lolli | 281/15.1 |
| 5,152,654 | A * | 10/1992 | Luhman et al. | 412/37 |
| 5,271,794 | A | 12/1993 | Jarrell et al. | |
| 5,346,350 | A | 9/1994 | Luhman et al. | |
| 6,024,525 | A | 2/2000 | Yamanaka | |
| 6,403,189 | B1 * | 6/2002 | Donahue | 428/40.1 |

(Continued)

FOREIGN PATENT DOCUMENTS

WO 99/38707 8/1999

*Primary Examiner*—Philip C Tucker
*Assistant Examiner*—Sonya Mazumdar

(57) ABSTRACT

A method and system for binding of sheets includes providing an adhesive layer supported on a first side of a backing material. Plural sheets are accumulated against the adhesive layer, and heat is applied to a side of the adhesive layer adjacent the backing material to locally melt only a portion of the adhesive layer in a vicinity of an additional sheet accumulated against the adhesive layer.

15 Claims, 4 Drawing Sheets

U.S. PATENT DOCUMENTS

| | | | | |
|---|---|---|---|---|
| 6,619,900 | B2 | 9/2003 | Cobene, II et al. | |
| 6,652,210 | B1 * | 11/2003 | Yeaple | 412/37 |
| 6,769,717 | B2 * | 8/2004 | Pacifici | 281/21.1 |
| 7,568,510 | B2 * | 8/2009 | Nagaya et al. | 156/359 |
| 7,695,229 | B2 * | 4/2010 | Cobene et al. | 412/8 |
| 2006/0072982 | A1 * | 4/2006 | Hoarau | 412/8 |

* cited by examiner

METHOD AND SYSTEM OF SHEET-WISE BINDING OF DOCUMENTS

BACKGROUND

Bookbinding systems can deliver bound documents, including books, manuals, publications, annual reports, newsletter, business plans and brochures. A bookbinding system collects a plurality of sheets (or pages) into a text body (or book block) and applies an adhesive to bind the text body to the cover to form bound documents. Typically, two adhesives are needed. A first adhesive, such as a hot melt adhesive, is needed to bind the plurality of sheets into a text body. A second adhesive, such as a pressure sensitive adhesive, is needed to bind the bound text body to a cover to form the bound document.

Many different systems have been proposed for applying adhesive to a text body spine to bind the text body sheets together.

A system of binding sheets is known which includes a multi-function sheet binder configured to heat a preformed solid hot melt adhesive to a melting temperature. The melted adhesive is formed by pressing the melted adhesive into a spine of a text body and folding down edges of the melted adhesive into contact with the text body. The formed adhesive is then cooled by an adhesive cooler.

A book binder is known that includes a tape heating apparatus with a main heater and a pair of side heaters. The main heater is configured to preheat the entire length of a hot melt adhesive tape. After the spine of a text body is pressed against the preheated hot melt adhesive tape, the pair of side heaters press the overhanging sides of the adhesive tape against the text body to complete the binding of the sheets into a bound text body.

A known apparatus for binding sheets includes an aligning plate that aligns the sheets at the side edge, and two clamping plates that hold the sheets during binding. A heating platen heats and melts a backless solid hot melt adhesive that is placed along the sheet edges. The hot melt adhesive binds the sheets together at the spinal area. The hot melt adhesive also may be used to attach a preformed book cover to the text spine.

Exemplary paperback bookbinding schemes include a cover, with an adhesive strip disposed along a spine area, that is forced between a pair of pressing rollers to form a pocket. A text body is inserted into the pocket with the text body spine in contact with the adhesive strip. The pressing rollers move forcibly toward one another to press the cover firmly against the front and back sides of the text body and to compress the text body sheets together tightly in the area adjacent to the spine. A sonic tool transmits sonic energy to the cover to activate the adhesive strip and, thereby, bind the text body sheets and the cover into a perfectly bound book.

A known adhesive applicator is configured to spread coat an adhesive onto the spine and side edges of the text body to bind the text body sheets and a cover into a perfectly bound book with an attached spine. The adhesive applicator includes a book spine coating nozzle with adjustable side sealing jaws for adjusting the nozzle width for different book thicknesses and separate side glue outlets for depositing glue on the book sides. Glue flow control valves are disposed between the spine coating nozzle and the side glue outlets so the glue deposited on the book sides may be selectively and independently cut off or controlled.

SUMMARY

An exemplary method of binding documents comprises providing an adhesive layer on a first side of a backing material, and applying heat to a side of the adhesive layer adjacent the backing material to locally melt only a portion of the adhesive layer in a vicinity of a sheet placed against the adhesive layer.

Another exemplary method of binding sheets comprises accumulating plural sheets to be bound by placing an edge of each sheet adjacent an adhesive strip and locally heating the adhesive strip to selectively melt a portion of the adhesive on the adhesive strip in a vicinity of less than all of the plural sheets to be bound.

An exemplary system of binding sheets comprises a clamp for accumulating plural sheets among a common edge, an adhesive layer disposed adjacent an edge of each of the plural sheets, and a heater for locally heating the adhesive layer in a vicinity of an additional sheet added to the plural sheets accumulated in the clamp.

BRIEF DESCRIPTION OF THE DRAWING FIGURES

The accompanying drawings provide visual representations which will be used to more fully describe the representative embodiments disclosed herein and can be used by those skilled in the art to better understand them and their inherent advantages. In these drawings, like reference numerals identify corresponding elements and:

DETAILED DESCRIPTION OF EXEMPLARY EMBODIMENTS

Figure 1:
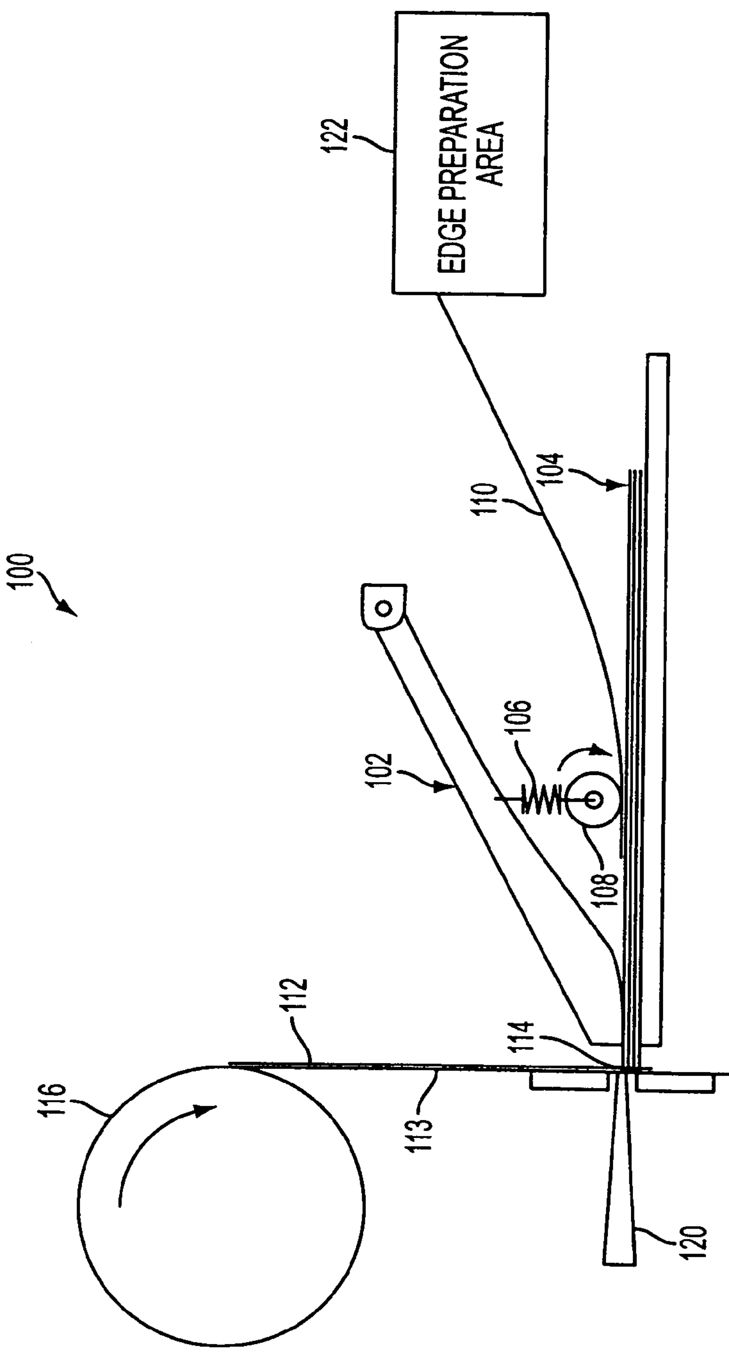
FIG. 1 illustrates an exemplary system for sheetwise binding of documents.

FIG. 1 illustrates an exemplary system 100 for binding sheets. The binding system 100 may be implemented as a desktop or office book making system designed to satisfy on-demand bookbinding needs. However, the document binding system 100 may also be used for any other suitable application, such as for commercial or home use.

The system 100 includes a clamp 102 for accumulating a plurality of sheets 104. Sheets 104 can enter the clamp 102 sheetwise; that is on an individual sheet-by-sheet basis. However, more than one sheet at a time may be accumulated in the clamp 102.

According to an exemplary embodiment, the clamp 102 includes a spring 106 and a roller 108. A newly added sheet 110 is transferred toward the adhesive by way of the roller 108. The spring 106 allows the distance between the jaws of the clamp 102 to be increased when a new sheet is added. For example, as a new sheet 110 is added, the spring is slightly compressed to accommodate for the newly added sheet. However, it should be understood that other constraining devices may be used. For example, plates and other constraining devices can be placed in contact with the newly added sheet to constrain the sheet thereon. The position and number of constraining devices can be a function of the paper properties, such as the paper weight, structural characteristics and so forth.

To bind the plurality of sheets 104 together, an adhesive is applied. For example, an adhesive layer 112 is supported on a backing material 113 and is disposed adjacent an edge 114 of each of the plurality of sheets 104. Examples of suitable adhesives include a hot melt adhesive, a light curable adhesive, or a moisture curable adhesive. A suitable light curable adhesive includes LC-1212 light curable adhesive available from 3M® Corporation of Minneapolis, Minn., which cures at a wavelength of 400 to 500 nm. Other suitable light curable adhesives include acrylate-based adhesives curable in the visible, ultraviolet (UV) or infrared (IR) spectrum. A single adhesive is used to bind the individual sheets together into a text body and to bind a text body to the cover. However, it should be understood that more than one adhesive can be used.

According to an exemplary embodiment, the backing material 113 allows the adhesive to be applied to the individual sheets, while protecting and preserving the side of the adhesive to be attached to the cover until the sheetwise binding operation is complete. In this way, the backing material 113 may be coated, so that it may be easily removed from the adhesive layer 112 when a cover is to be attached to the text body.

According to an exemplary embodiment, the adhesive layer 112 may be dispensed with a roller 116. When the adhesive layer 112 is dispensed by roller 116, a counter roller 118 collects unused backing material 113. Alternatively, the adhesive layer 112 may be dispensed in predetermined lengths. For example, the length of the sheets and the width of the text body are measured prior to applying the adhesive. An adhesive layer 112 is then measured and precut to meet the particular bookbinding needs. However, it should be understood that the adhesive may be applied in any suitable manner.

To attach the adhesive to the edges 114 of the plurality of sheets 104, the adhesive layer 112 is heated. A heater 120 is disposed on a side of the adhesive layer adjacent the backing material 113 to locally melt only a portion of the adhesive layer in a vicinity of a sheet 110 placed against the adhesive layer 112. The heater 120 can be sized according to the size of a sheet edge placed adjacent to the adhesive layer 112. For example, a surface of the heater facing sheet 110 can be as wide and long as an individual sheet to be bound. However, it should be understood that the size of a heating surface of the heater may be chosen depending on design preference and applicability. According to the exemplary embodiment, the heating surface is at least 0.5 mm wide, but may be wider and narrower as described above. To heat at a faster rate, a heater 120 with a wider heating surface can be provided to heat more than one sheet at a time. According to an exemplary embodiment, the heater 120 preferably operates at approximately 160° C. (e.g., ±10%), or at any desired temperature lesser or greater than 160° C. For example, depending on the particular adhesive used, this temperature can be varied as empirically deemed appropriate to achieve a desired melt rate for a chosen volume of a selected adhesive over a desired area.

The system 100 optionally includes an edge preparation area 122, in which the each of the plurality of sheets 104 along the contacting surface is prepared prior to being placed adjacent the adhesive layer 112. In an exemplary embodiment, edge preparation area 122 includes devices for performing one or more of roughing, cutting, tearing, trimming, bending, folding and perforating of the sheets. Additional edge preparation devices and methods include devices for notch binding, in which notches are made on the contacting surface, e.g., edge or folded edge, by removing small sections to allow penetration of adhesive into individual sheets, and bursting binding in which large cuts made in the contacting surface of the sheet allow penetration of the adhesive material. Slits can also be made on the contacting surface with, for example, a toothed wheel, and milling the contacting surface with a grinder to produce rough edges. Fibers in the sheet exposed in these methods strengthen adhesion between the adhesive material and the sheet. Also, the area of the contacting surface exposed to the adhesive can be increased to thereby increase the binding strength.

In an exemplary embodiment, the adhesive layer 112 including the backing material 113 is placed adjacent an edge 114 of the plurality of sheets 104. As each sheet 104 is placed in the clamp 102, the heater 120 can include a motor device to move the heating surface into a position to locally heat the adhesive layer 112 in a vicinity of that sheet. Alternatively, the heater 120 may remain stationary, while the clamp 102 moves to align a newly added sheet 110 with the heater 120, or both the heater and the clamp can be moved synchronously to align the heating surface with one or more desired sheets.

Figure 2:
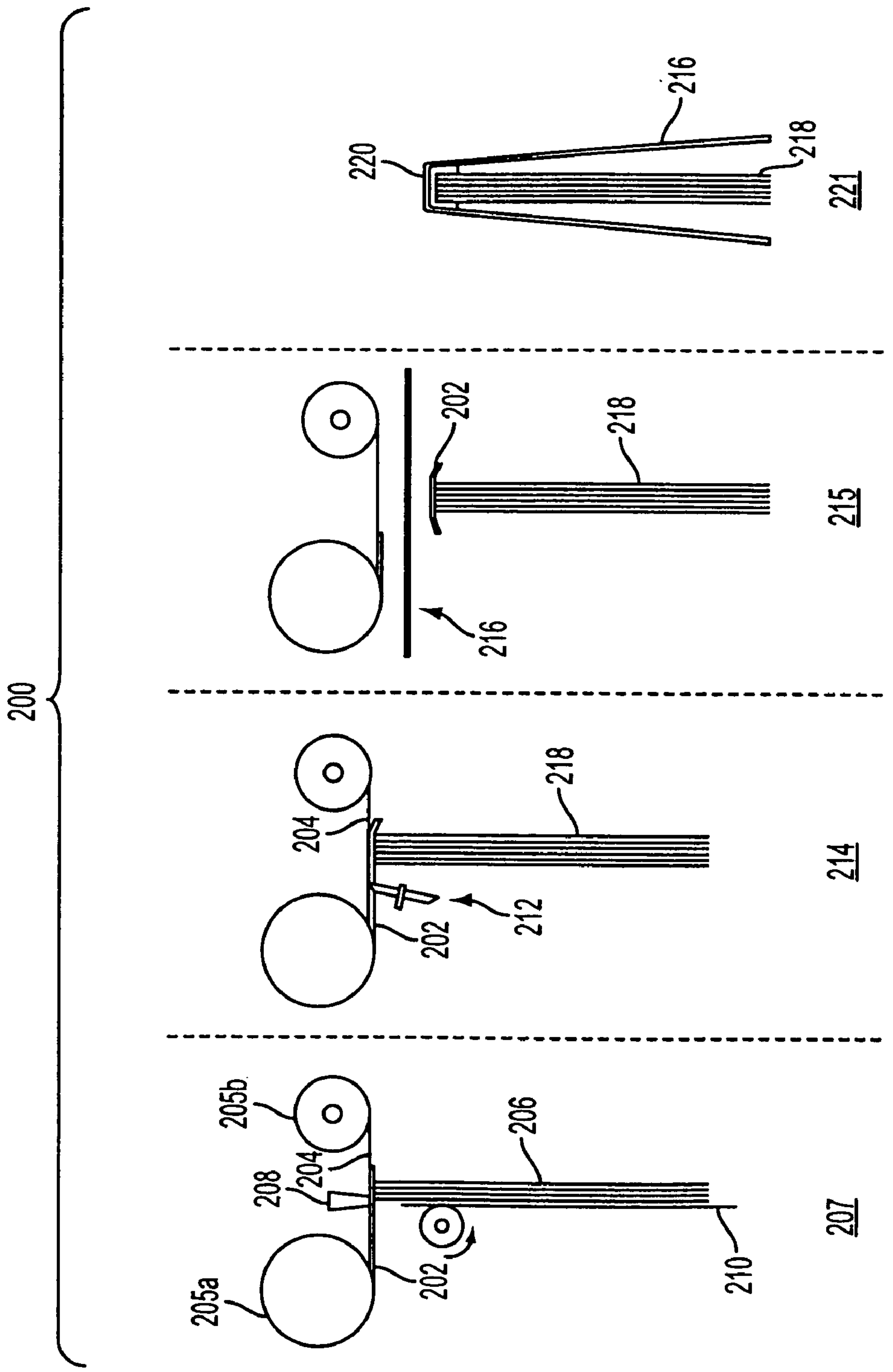
FIG. 2 illustrates an exemplary method of sheetwise binding of documents.

An exemplary method of sheetwise binding of documents is illustrated in FIG. 2. The FIG. 2 method 200 comprises providing an adhesive layer 202 supported on a first side of a backing material 204. According to the exemplary method, the adhesive layer 202 and backing material 204 are dispensed by way of a roller 205*a* and the unused backing material 204 is collected by way of counter roller 205*b*. However, the adhesive layer 202 may also be applied in predetermined sizes.

The exemplary method includes accumulating plural sheets 206 against the adhesive layer 202 and applying heat locally to the adhesive layer 202 in an accumulating operation 207. According to the exemplary embodiment, a heater 208 is applied to a side of the adhesive layer 202 adjacent the backing material 204 to locally melt only a portion of the adhesive layer 202 in a vicinity of an additional sheet 210 accumulated against the adhesive layer 202.

Once the sheets 206 are accumulated against the adhesive layer 202 and the adhesive layer 202 and the plural sheets 206 are bound into a text body 218, the adhesive 202 may be cut by a cutter 212 in a cutting operation 214. Excess backing material 204 may then be removed by way of counter roller 205*b*.

In a subsequent operation 215, a cover 216 is applied over the text body 218 and against the exposed adhesive layer 202. The cover can be prepared to a selected spine width, such as a spine width corresponding to a dimension of the text body. The resulting bound document 220 includes the cover 216 adjacent the text body 218, as shown in operation 221.

Figure 3:
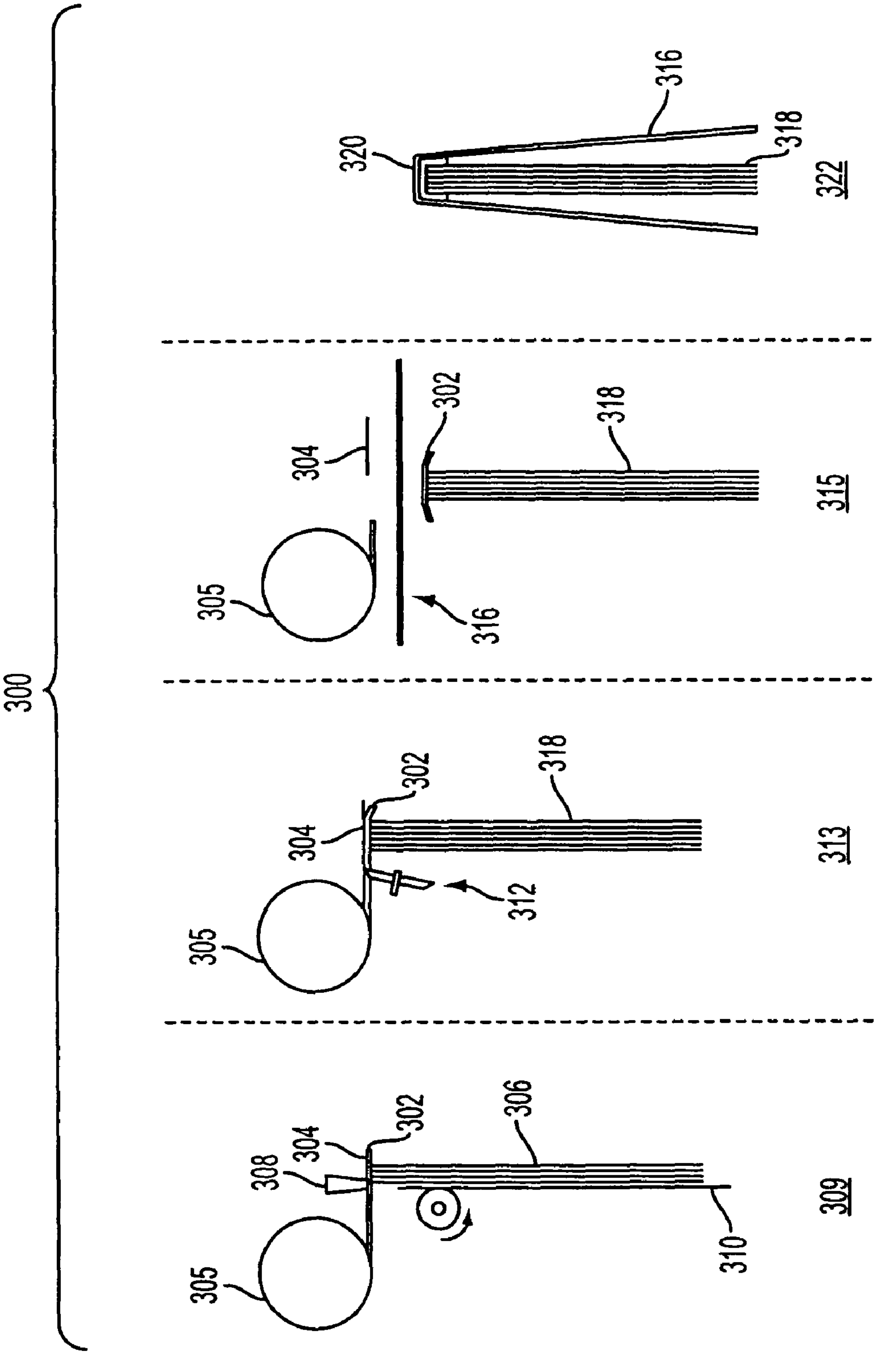
FIG. 3 illustrates another exemplary method of sheetwise binding of documents.

Another exemplary method of sheetwise binding of documents is illustrated in FIG. 3. The FIG. 3 method 300 comprises providing an adhesive layer 302 supported on a first side as a backing material 304, as shown in operation 309. According to the exemplary method, the adhesive is dispensed by way of a roller 305. However, the adhesive layer 302 may also be applied in predetermined sizes.

According to operation 309, plural sheets 306 are accumulated against the adhesive layer 302, and heated by way of heater 308 (located, for example, adjacent the backing material 304) to locally melt a portion of the adhesive layer 302 in a vicinity of an additional sheet 310. Once the sheets are accumulated into a text body 318, the adhesive layer 302 and the backing material 304 are cut by way of cutter 312 in a cutting operation 313. The adhesive layer 302 and backing material 304 are cut so that portions of the adhesive layer and backing material extend beyond a spine of the text body 318. Both the backing material 304 and adhesive layer 302 can be cut at the same time. Because the backing material 304 is also cut, a counter roller is not needed for the remaining backing material.

In an optional operation, the portions of the adhesive layer 302 and backing material 304 extending beyond the bound text body 318 may be folded over, or compressed and then heated against the first and last sheets accumulated so that adhesive is exposed beyond the backing material on the first and last sheets. The backing material 304 may remain on the adhesive layer 302 when a cover is applied. In this way, a floating spine is produced. Alternatively, the backing material may then be completely removed.

In a subsequent operation 315, a cover 316 is applied over the text body 318 and against the exposed adhesive layer 302. The cover 316 can be prepared to a selected spine width, such as a spine width corresponding to a dimension of the text body. The resulting bound document 320 includes the cover 316 adjacent the text body 318, as shown in operation 322.

Figure 4:
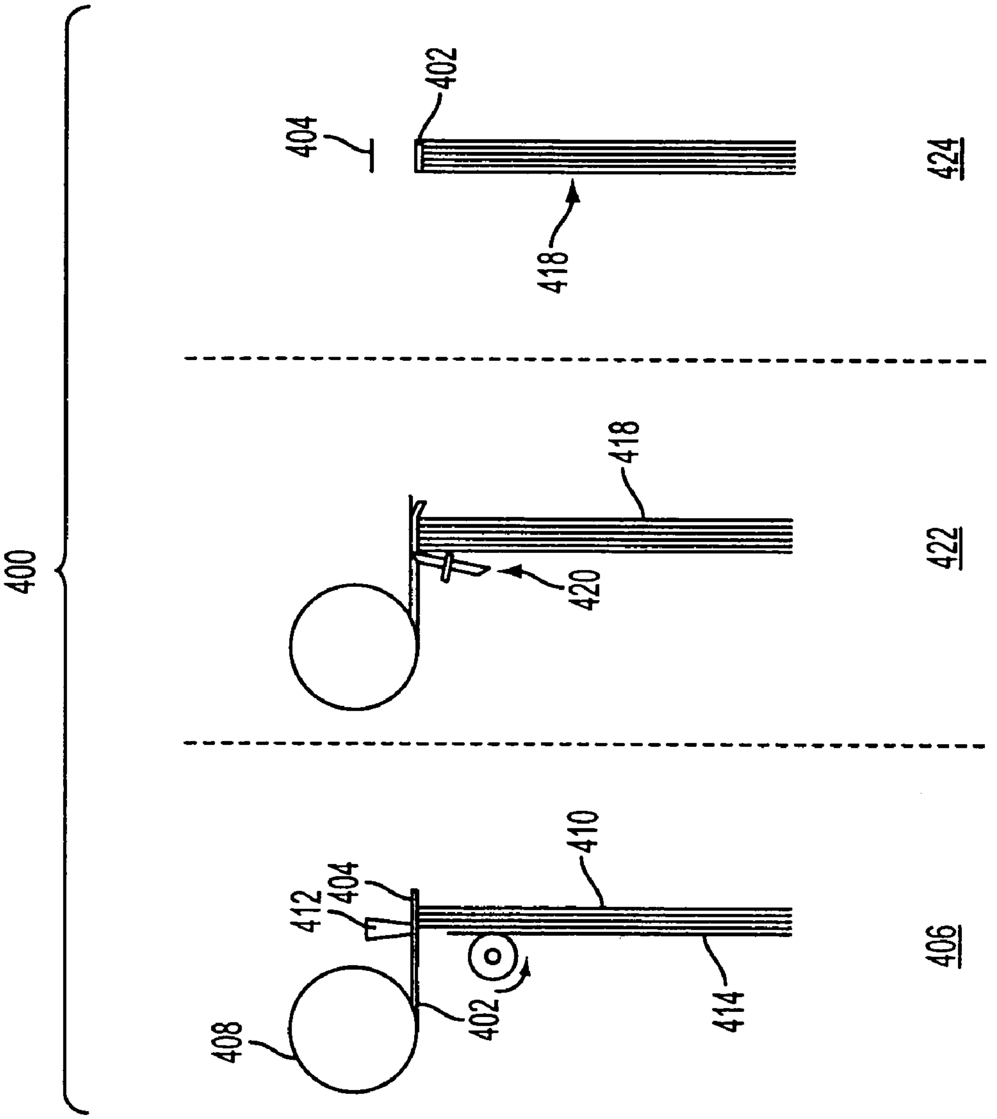
FIG. 4 illustrates another exemplary method of sheetwise binding of documents.

Another exemplary method of sheetwise binding of documents is illustrated in FIG. 4. The FIG. 4 method 400 comprises providing an adhesive layer 402 supported on a first side as a backing material 404, as shown in operation 406. According to the exemplary method, the adhesive is dispensed by way of a roller 408. However, the adhesive layer 402 may also be applied in predetermined sizes.

According to operation 406, plural sheets 410 are accumulated against the adhesive layer 402, and heated by way of heater 412 (located, for example, adjacent backing material 404) to locally melt a portion of the adhesive layer 402 in a vicinity of an additional sheet 414. Once the sheets are accumulated into a text body 418, the adhesive layer 402 and the backing material 404 are cut by way of cutter 420 in a cutting operation 422. The adhesive layer 402 and backing material 404 are cut so that excess adhesive and backing material protruding beyond the sides of the text body 418 are removed. Both the backing material 404 and adhesive layer 402 can be cut at the same time. Because the backing material 404 is also cut, a counter roller is not needed for the remaining backing material.

The backing material 404 is then separated from the adhesive layer 402 in a separation operation 424. A cover can then be folded around the text body.

In accordance with an exemplary method and system, a single adhesive is used to both bind the text body and add a cover. To make the backing material removable, the backing material is coated which enables it to be removed after applying heat. In addition, an exemplary system and method are capable of binding as few as two sheets of paper into a text body.

The presently disclosed embodiments are considered in all respects to be illustrative and not restrictive. The scope is indicated by the appended claims, rather than the foregoing description, and all changes that come within the meaning and range of equivalents thereof are intended to be embraced.

What is claimed is:

1. A method of binding sheets, comprising:

providing an adhesive layer on a first side of a backing material;

placing a sheet having a cut edge, the cut edge being positioned against the adhesive layer; and applying heat to a side of the adhesive layer adjacent the backing material to locally melt only a portion of the adhesive layer in a vicinity of the cut edge of the placed sheet positioned against the adhesive layer, wherein the sheets are bound to the adhesive layer one sheet at a time.

2. The method of claim 1, comprising:

removing the backing material from the adhesive layer after plural sheets are bound; and pressing a cover over the adhesive layer and the bound sheets.

3. The method of claim 1, comprising:

moving a heater to apply heat locally to the adhesive layer.

4. The method of claim 1, wherein plural sheets are accumulated in a clamp, the clamp being adjustable to accept an additional sheet to be bound.

5. A method of binding sheets, comprising:

providing an adhesive layer on a first side of a backing material; and applying heat to a side of the adhesive layer adjacent the backing material to locally melt only a portion of the adhesive layer in a vicinity of a sheet placed against the adhesive layer;

cutting through the adhesive layer;

separating the backing material from the adhesive layer to expose a side of the adhesive layer after the sheets are accumulated and bound into a text body; and applying a cover over the text body and against the exposed adhesive layer.

6. The method of claim 1, comprising:

cutting through the adhesive layer and the backing material after plural sheets are accumulated and bound into a text body to remove excess adhesive and backing material protruding beyond sides of the text body.

7. A method of binding sheets, comprising:

providing an adhesive layer on a first side of a backing material; and applying heat to a side of the adhesive layer adjacent the backing material to locally melt only a portion of the adhesive layer in a vicinity of a sheet placed against the adhesive layer;

cutting through the adhesive layer and the backing material after plural sheets are accumulated and bound into a text body so that portions of the adhesive and backing material extend beyond a spine of the bound text body;

compressing and heating the portions extending beyond the bound text body against first and last sheets accumulated to bind the adhesive layer against portions of the first and last sheets accumulated so that adhesive is exposed beyond the backing material on the first and last sheets; and applying a cover over the text body and against the exposed adhesive to form a floating cover.

8. A method of binding sheets, comprising:

accumulating plural sheets to be bound by placing an edge of each sheet adjacent an adhesive strip;

locally heating the adhesive strip to selectively melt a portion of the adhesive on the adhesive strip in a vicinity of less than all of the plural sheets to be bound.

9. A method of binding sheets, comprising:

accumulating plural sheets to be bound, each of the plural sheets being sequentially placed adjacent to an adhesive strip; and locally heating the adhesive strip, wherein the adhesive strip is locally heated on a sheet-by-sheet basis, as each of the sheets is placed adjacent to the adhesive strip.

10. A method of binding sheets, comprising:

accumulating plural sheets to be bound by sequentially placing sets of sheets adjacent to an adhesive strip; and locally heating the adhesive strip each time a new set of sheets is placed adjacent to the adhesive strip.

11. The method of claim 9, wherein the adhesive strip is supported on a first side of a backing material.

12. The method of claim 11, wherein the backing material is coated so that the backing material can be removed from the adhesive strip.

13. The method of claim 12, comprising:

removing the backing material from the adhesive strip after the sheets are bound into a book body; and pressing a cover over the adhesive strip and the bound book body.

14. The method of claim 9, wherein the sheets are bound to the adhesive layer one sheet at a time.

15. The method of claim 9, wherein the sheets are bound to the adhesive layer one sheet at a time.

* * * * *

UNITED STATES PATENT AND TRADEMARK OFFICE

CERTIFICATE OF CORRECTION

PATENT NO. : 7,794,560 B2
APPLICATION NO. : 10/953549
DATED : September 14, 2010
INVENTOR(S) : Eric Hoarau It is certified that error appears in the above-identified patent and that said Letters Patent is hereby corrected as shown below:

In column 7, line 1, in Claim 11, delete “claim 9,” and insert -- claim 8, --, therefor.

In column 8, line 3, in Claim 14, delete “claim 9,” and insert -- claim 8, --, therefor.

Signed and Sealed this
Fifteenth Day of March, 2011

David J. Kappos
*Director of the United States Patent and Trademark Office*